United States Patent Office 3,336,790
Patented Aug. 22, 1967

3,336,790
THERMOGRAPHIC CALORIMETRY DEVICE
Nickolai Alexeevich Nedumov, Moscow, U.S.S.R., assignor to Institute metallurgii imeni A.A. Baikova, Moscow, U.S.S.R.
Filed May 5, 1964, Ser. No. 365,107
7 Claims. (Cl. 73—15)

The present invention relates to thermographic devices, and more particularly to devices for determining the amount of heat and corresponding temperature which characterize phase transformations, chemical reactions and other changes in the physico-chemical properties of metals, alloys, ores and organic-compound oxide salts in heating and cooling as well as at constant temperatures within a wide temperature range of 20–2800° C.

It is well known, that in thermography the temperature and the amount of heat, absorbed or evolved by the object under examination, are continuously recorded in time both in direct and differential form when the object is being heated, cooled or kept under isothermic conditions.

The temperature is determined from the deviation of a direct record, while the amount of heat is evaluated from the area defined by the deviation of a differential curve.

As a known standard the thermograms of the so called indication substances are used, said substances having their transformation temperature and heat determined earlier with a sufficient accuracy.

All thermographic devices commonly employ, as their principal units, various furnaces which provide for the heating and cooling of a specimen at a uniform constant rate.

Temperature changes are recorded and heat effects are sensed predominantly by means of thermocouples, the junctions of which are in contact with the specimen and the standard substance kept in a metal block under equal thermal conductions.

A differential record is obtained by thermocouples sensing the difference of heat-flows in the specimen and the standard substance during the change of their properties and internal structure along with absorption or evolution of energy.

Known thermographic devices are rather versatile as to their efficiency in determining the temperature range of phase transformations. In case the temperature is above 1500–1700° C. it is not feasible to apply contact thermographic devices—due to the growing activity of objects under examination and instability of their parameters to be measured. Within a high-temperature range of 800–3000° C. and above, the thermal analysis entails application of optical means for temperature measurements, predominantly for determining the liquidus and solidus points.

However, the sensitivity and accuracy of the optical instruments appeared to be insufficient for determining the existence of thermal effects in solid substances. The most successful design solutions in applying thermocouples to quantitative thermography at temperatures of up to 1000° C. are devices which operate by various methods, and provide as the most accurate results, ±1 to ±3% in heat and temperature measurements.

However, at higher temperatures the application of thermocouple devices involves serious difficulties as to the design and method, when attempting to achieve accurate quantitative results in measuring heat values and temperatures corresponding to these values.

A further disadvanatge of the existing thermographic devices lies in the fact that the obtained thermograms reflect only the amount of heat and the temperature characterizing the change in the substance properties, which in turn is due to the fact that the sensing of the amount of heat in the volume of the object under examination is done by the point junction of the thermocouple.

Under conditions, prevailing in a heat flow, the thermal inertia and uneven distribution of temperature make the results of measurements dependent on the geometrical characteristics of the thermocouple junction, contacting area, on the shape and dimensions of the specimen, as well as on various effects of heat exchange in structural elements and standard substances, their thermo-physical properties and location in relation to the source of heating and cooling.

Therefore, a partial elimination of the said disadvantages in thermography is achieved by minimizing the mass of the specimen to be examined.

However such reduction of the specimen dimensions involves a considerable decrease in the thermogram area of the thermal effect being determined and hence a decrease in the accuracy of its determination from the area of maximum. Besides it should be pointed out, that application of such masses as 0.02–0.50 gr. involves a greater probability for the specimen to be contaminated at high temperatures and for the results of measurements to become non-objective.

At higher temperature levels the thermocouple changes its constant parameters due to the interaction of the junction with the contacting substance, the physico-chemical activity of which undergoes a substantial increase.

This involves the effect of the growing electric conductivity with the rising temperature and the lengthening of the operation time of electro-insulating materials applied in structural elements of the thermographic devices.

Yet a further disadvantage, characteristic of the most perfect calorimetric devices operating at high temperatures, is the absence of positive ways and means to account and compensate for various degrees of dissipation of the measured heat in dependence on the temperature rise and the changes in pressure and total heat escape.

Even when the technical imperfections of the calorimeters are rectified and eliminated and the heat-exchange effects of the structural elements are compensated the same reason will be responsible for the considerable reduction of areas related to the constant thermal effect being defined by the deviation of the differential curve.

An object of the present invention is to eliminate said disadvantages and to provide a thermographic device for non-contact measuring of the amount of heat absorbed or evolved by the surfaces of bodies due to changes in their physico-chemical properties, the measurements to be made in a temperature range of about 20–2800° C. and with an accuracy of 0.5 to 4 percent.

This object is achieved by the use of a thermographic-calorimetry device comprising a furnace for continuous heating and cooling of a specimen at a preset rate, a block for measuring temperatures and sensing changes in the heat-content of the specimen, said block being provided with a thermo-insulating casing which accommodates a specimen to be examined and thermo-sensitive elements; and an instrument to record the temperature in time both in direct and differential forms.

According to the invention the block for measuring the temperature and sensing the changes in the heat content of the specimen under examination is divided into two equal compartments, one of which accommodates a specimen to be examined and the second—a standard source of heat radiation, the said specimen and standard source of heat radiation being surrounded by low-ohmic resistors without contacting them, all the elements in each compartment being arranged symmetrically in relation to the heat flow, their thermo-physical properties being counterbalanced except for the specimen, and hence each compartment being fed with an equal amount of heat per unit of time.

It is preferable to locate the specimen to be examined and the standard source of heat in crucibles, as well as to arrange the low-ohmic resistors of the said two compartments along a cylinder generatrix between the heat-insulating casing and the crucibles, covering them with a heat-insulating partition, and to encircle the block, for measuring the temperature and sensing the change in the heat-content, with a screen to protect it from the effect of convection flows.

When taking calorimetric measurements in a high-temperature range and employing cleaned inert medium and vacuum, it is desirable to use tungsten for the block body, for the screen and for the low-ohmic resistors.

As an instrument for recording the temperature in time both in direct and differential forms, it is preferable to use three galvanometers, one of them being connected to the bridge-diagonal of the low-ohmic resistors and the rest—joined in parallel to the low-ohmic resistors. Additional accuracy control in measuring high temperatures should preferably be effected by means of a standard optical pyrometer recording the temperature by a black-body model.

The present invention provides for a considerable widening of the temperature range, embraced by high-accuracy measurements of the temperature and amount of heat which characterize changes in the physico-chemical properties of substances with various masses and volumes, under conditions of increased rates of heating and cooling, as well as isothermic conditions.

Besides, the absence of contact between the thermosensitive element and the substance, as well as the compensation for the factors relating to varying heat-exchange conditions, which affect the system in its univocal sensing of heat and temperature, characterizing the physico-chemical properties of the specimen, improve the objectivity and simplifies the operation of the instrument under various conditions and particularly in examining refractory and chemically active substances, and the application of two coupled alternately acting furnaces, one of which can be used for tempering at high temperatures, provides for a higher accuracy in determining the nature of thermal effects, as well as for a round-the-clock operation with simultaneous repair of one of the furnaces or calibration of the measurement scales, ways and means being available which make it possible to ascertain the positive assemblage of structural elements.

While a specific embodiment of the present invention will be disclosed in the description below, it is to be understood that various modifications and variations may occur to those skilled in the art without departing from the spirit and scope of the invention. Therefore it is intended that no limitations be placed on the invention except as defined by the spirit and scope of the appended claims.

The invention will be more clearly understood from the following description and the accompanying drawings, wherein.

Figure 1:
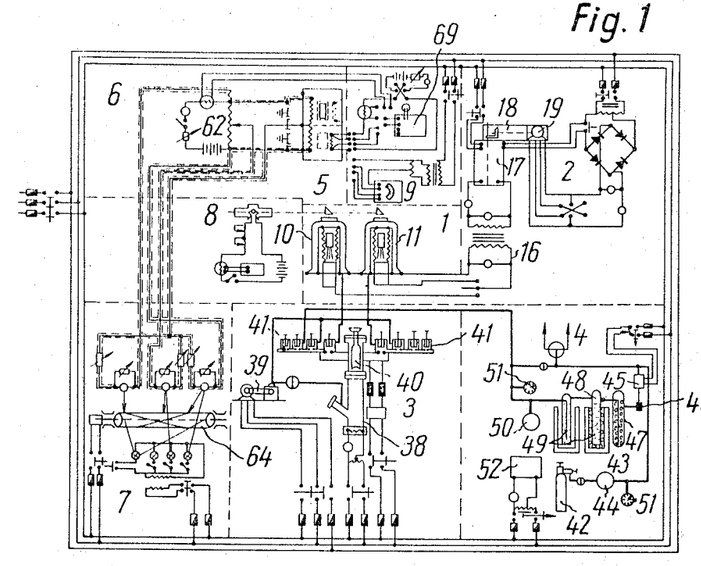
FIG. 1 shows a general schematic view of the device.

The device shown in FIG. 1 comprises nine principal assemblies which can be united into two groups.

The first group includes means for producing the necessary conditions for continuous heating and cooling of specimens at a preset constant rate within the temperature range of 20 to 2800° C. when kept in vacuum and in a continuously cleaned inert medium.

The group comprises: assembly 1—two vacuum furnaces with tungsten resistance-heaters, assembly 2—an electric power supply ensuring preset conditions of heating and cooling at constant rates, assembly 3—a vacuum producing unit, assembly 4—a continuous helium-cleaning unit.

The second group comprises means for sensing, measuring and recording the temperature and the amount of heat which characterizes the changes in physico-chemical properties of the bodies under examination. The group includes: assembly 5—a screening tungsten block for measuring the temperature and the amount of heat absorbed or evolved by the surface of the body under examination as a result of heat exchange with the surrounding medium, assembly 6—an electrical low-ohmic bridge of a differential resistance-thermometer, assembly 7—a photo-recording pyrometer, assembly 8—a standard optical pyrometer, assembly 9—a potentiometer and a wattmeter which are applied in plotting the scale of heat sensing in relation to the temperature, as well as in determining the heat content of the specimen under examination. Assembly 9 is designed for checking the constancy of parameters of the bridge-circuit of the differential resistance-thermometer.

Figure 5:
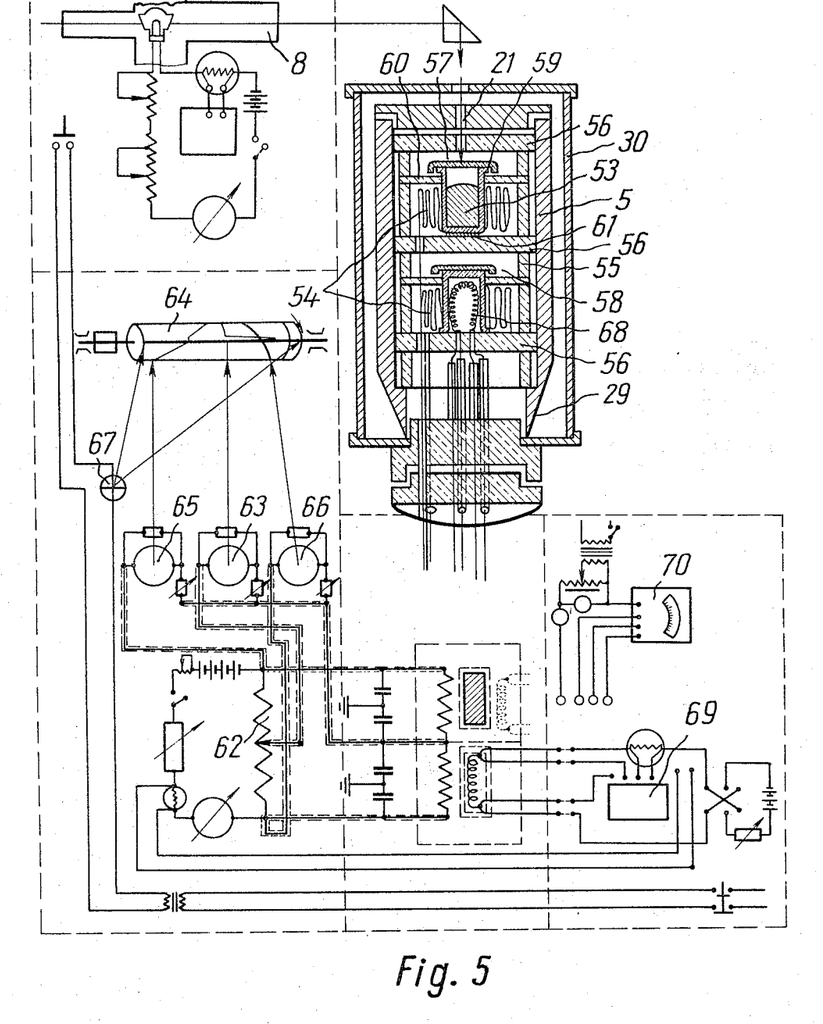
FIG. 5 shows a screen tungsten block.

Conditions of continuous heating and cooling of specimens at a preset constant rate within a temperature range of 20–2800° C., are provided by vacuum furnaces 10 and 11 which have tungsten heaters 12 (FIGS. 2 and 3) made in the shape of coils tightly adjoining each other in two layers. Heaters 12 by means of stop screws 13 are connected in parallel to the clamping heads of the upper 14 and lower 15 water-cooled current leads. Electric power supply 2 is connected to step-down transformer 16 (FIG. 1), which in turn, is connected to autotransformer 17. The necessary rate of heating and cooling, for instance from 0.3° C. to 85° C. per minute is achieved by changing the position of gears in an eight-step speed reduction unit 18 and by varying the power consumed by its electric motor 19. The most expedient means for uniform temperature distribution throughout the working part of the furnace are coil heaters with external screening heating layers. These heaters feature a considerably lower heat transmission to the cooled current-leads as compared to the tubular ones. For this very purpose upper screens 20 (FIG. 2) are also provided, made of round tungsten plates with central holes 21 for optical means of temperature measurement. A similar hole 21 and for the same purpose is provided in the lid of block 5 (FIG. 5).

Figure 2:
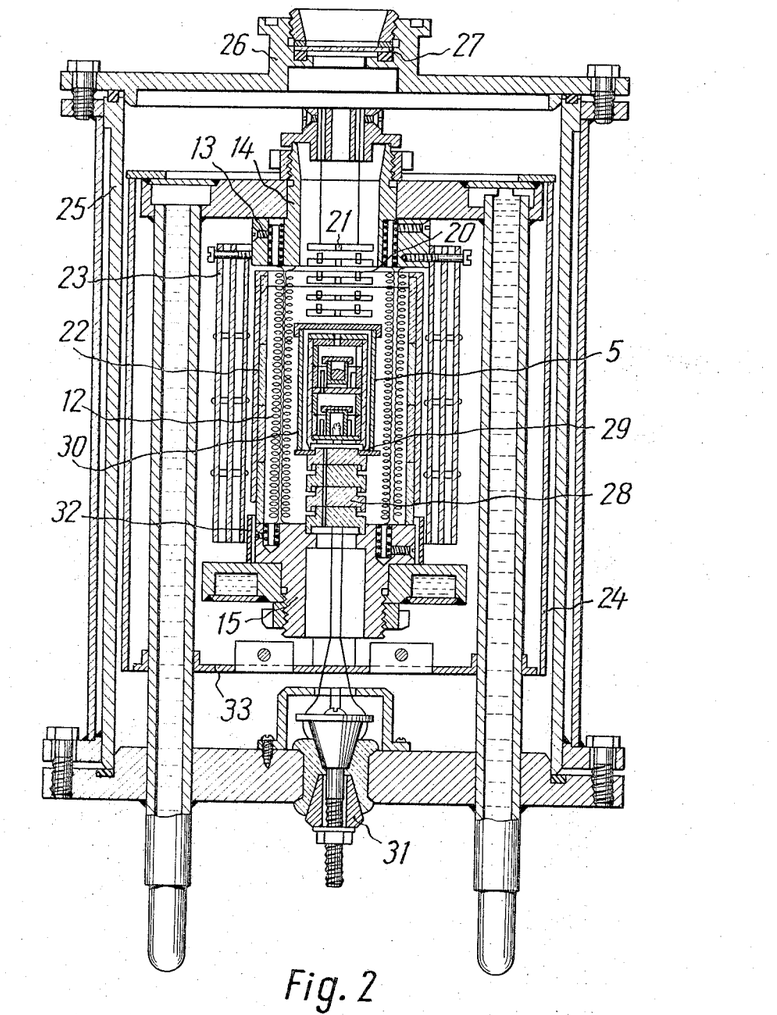
FIG. 2 shows in section a high-temperature vacuum furnace for thermographic calorimetry.

The side screens are made up of internal ceramic half-rings 22 fastened together by a tungsten housing, molybdenum three-layer half-cylinders 23 and an outer cylinder 24.

The furnace is closed by a vacuum water-cooled cap 25 with upper lid 26, the latter having vision slot 27 to be used when measuring the temperature by means of a standard optical pyrometer.

Lid 26 facilitates the change of specimens in the furnace.

In thermal analyzing and thermographic calorimetry screening tungsten block 5 is used, mounted on supports 28 and having chamfers 29 on its base. The base of block 5 accommodates tungsten cylindrical screen 30 which ensures an even distribution of temperature throughout its height under conditions of inert gas convection-flow.

Tap wires leading to the measuring and recording instruments are led through conical rubber packing-glands 31 in the lower part of the furnace.

Electric arc is precluded by quartz half-rings 32. The lower part of the furnace is protected against overheating by means of copper plate 33, which is fixed on the stanchions of the upper water-cooled current leads 14.

The second furnace of the present thermographic device (FIG. 3) is provided with a system of heaters and screens similar to those shown in FIG. 2.

Figure 3:
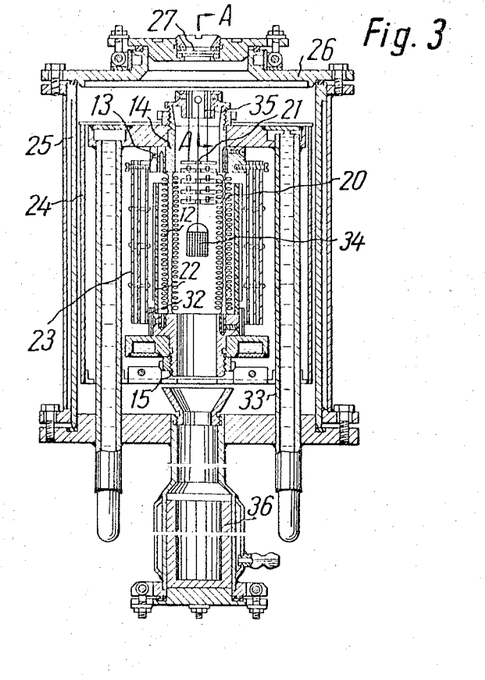
FIG. 3 shows in section a high-temperature vacuum furnace for examining microstructures, after tempering.

This furnace, in addition to thermal analyzing and thermographic calorimetry is also adapted to create conditions for tempering at high temperatures. For this purpose several specimens are placed in tungsten container 34 where they are separated from each other by thin plates of refractory oxides. The container has a hole for rapid admission of the coolant.

Figure 4:
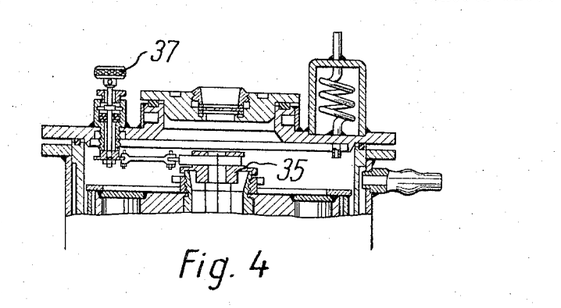
FIG. 4 shows a cross-section taken on line A—A of FIG. 3.

The specimens by means of a tungsten wire are suspended on a special attachment fixed on holder 35 (FIG. 4) of upper screens 21 (FIG. 3).

Container 34 with specimens is dropped into cooler 36 upon turning knob 37 (FIG. 4) located on upper lid 26 of cap 25. The specimens are discharged from below by opening the lower lid of cooler 36.

Vacuum furnaces 10 and 11 are arranged side by side according to the diagram shown in FIG. 1. Both furnaces have a common system of electric power supply 2 with a commutation circuit for control and checking.

The whole installation is provided with a system of water-cooling. There is also a vacuum-producing system for furnaces 10 and 11. This system ensures a vacuum of up to $10^{-6}$ mm. H and comprises pump 39 (FIG. 1) and diffusion pump 38 with a nitrogen catch 40.

A system of valves 41 is provided for preliminary pumping-out of the furnaces, admission of air and inert gas, as well as for heavy pumping-out of the furnaces and pumping-out helium cleaning unit 4. The system for continuous cleaning of helium serves for precluding changes in the present compositions of the substances under examination and for protecting the thermosensitive elements against the effect of vapors.

The 99.88% clean helium ($H_2$—0.025%, $N_2$—0.08%, $O_2$—0.002%, $H_2O$—40 mgr./l.) is discharged from cylinder 42 (FIG. 1) into cylinder 44 through vacuum filler 43.

Special pump 45 is provided for helium circulation at a preset rate through a closed circuit which comprises capillary vessel 46, a cleaning column with silica gel 47, coil 48, two cleaning columns 49 with activated coal and cooled liquid nitrogen, and furnaces 10 and 11. The cleaned helium from cylinder 50 is delivered into furnaces 10 and 11 and by means of pump 45 is conveyed back into cleaning columns 47 and 49.

The rate of gas circulation is regulated by varying the current load on the circulation-pump electric motor. The constancy of pressure is checked by means of vacuum-pressure gauges 51. Such a cleaning system is expedient because its efficiency can be easily restored by heating two columns 47 and 49 in furnace 52 in vacuo at 180° C. during 6–8 hours.

The main unit, intended for determining the amount of heat absorbed or evolved during a definite period of time by the bodies under examination in relation to their temperature and internal structure, is screening tungsten block 5 fixed in the working part of furnace 10 (FIG. 2) on special stanchions 28 to ensure minimum escape of heat from block.

It is well known, that all the processes, connected with changes of physico-chemical properties occurring in heating and cooling due to thermal inertia in a symmetric system of block 5 surrounded by the heaters 12, start from the surface of the body under examination 53 (FIG. 5).

The temperature, characterizing the process on the surface of body 53, is ascertained by measuring and direct recording the mean temperature in the enclosure, defined by the surface of body 53 and the internal insulation walls of block 5, said measurements being made by means of thermosensitive elements with a sufficiently large surface i.e. by the low-ohmic tungsten resistance-thermometers 54 arranged around specimen 53.

By way of experiments it has been established that low-ohmic resistance-thermometers feature a considerably smaller absolute error in measuring temperature than thermocouples; this is particularly the case for measurements in a high-temperature range.

To minimize the difference between the measured temperature and the temperature on the surface of a body, tungsten block 5 is made as a massive structure protected by screen 30 (FIG. 5). For the same purpose heat-insulating casing 55 of refractory oxides is used.

In order to provide for a differential record appropriately reflecting the change in the heat content of specimen 53, and to preclude the effect of heat-exchange between the elements, not entailed in the investigations, all the structural elements of block 5 are arranged symmetrically in relation to the surface of heater 12 of furnace 10.

For the same purpose the internal space of the block is divided, by means of heat-insulating partitions 56, into two equal parts—the specimen heat-exchange compartment 57 and the neutral (standard) heat-exchange compartment 58.

Screening block 5 is located in the working space of the furnace in such a manner as to make equal amounts of heat enter both compartments 57 and 58 per unit of time.

This condition is checked both in heating and cooling by the equilibrium of the bridge arms of the differential resistance-thermometer when there is no specimen 53 in compartment 57.

Each compartment contains equal numbers of structural elements with equal thermo-physical properties.

These elements include crucibles 59 with lids, low-ohmic resistors 54, an additional partition 60 for preventing the specimen vapors from reaching thermo-sensitive element 54 in compartment 57. In compartment 58 partition 60′ renders compensation of thermo-physical properties. For the same purpose compartment 57 is provided with an additional mass of tungsten 61 formed as a pad under the crucible to compensate for the excess of tungsten elements in compartments 58.

Resistors 54 in compartments 57 and 58 form, together with measuring slide wire 62, an electric bridge, where galvanometer 63, connected to its diagonal, makes a differential thermographic record on rotating drum 64 covered with photographic paper. Thus, for the case when equal amounts of heat enter each compartment 57 and 58, the block system can be characterized at each moment by the following formula:

$$\frac{mCp}{m_0Cp_0} = \frac{o\overline{V}}{\overline{V}_1}$$

where:

$mCp/m_0Cp_0$ is the relation of the heat-content of a specimen to the heat-content of all structural elements in compartment 57 of 58;

$\overline{V}/\overline{V}_1$ is the relation of the difference of mean-integral rates of temperature change in compartments 57 and 58 to the mean-integral rate of temperature change in compartment 57.

The temperature, characterizing the change in physico-chemical properties on the surface of specimen 53, is recorded on the photographic paper of drum 64 by means of galvanometer 65 which is connected in parallel to resistor 54 of compartment 57.

In a similar way resistor 54 in compartment 58 is connected to another galvanometer 66 which records on the photographic paper of drum 64 the temperature characterizing the external standard energy conditions causing changes in the physico-chemical properties on the surface of the body under examination.

Still higher accuracy is achieved in measurements by way of additional temperature control in compartment 57 by a black-body model with the aid of a standard optical pyrometer. The measured temperature is recorded on the photographic paper of drum 64 by light marker 67. The temperature scale for galvanometers 65 and 66 of pyrometer 8 is plotted by means of differential thermograms of the heating and cooling of standard materials, predominantly by the temperature at the beginning of melting and crystallization of pure metals.

The beginning of the temperature reading, determined by the deviation of two direct records, taken by means of galvanometers 65 and 66, are two zero points in the thermogram, which correspond to the temperature of water-cooling of current leads 14 and 15 and cap 25 of furnaces 10 and 11 before starting the heating.

Thus a distinguishing feature of the non-contact method of determining the phase-transformation temperature range, particularly for the alloys (typical or solid solutions, eutectic, eutectoid and supereutectic mixtures) resides in the fact that the beginning of transformations is determined from the heating thermograms and the end of transformations from the cooling thermograms.

However the elimination of structural disadvantages and effects of outside heat-exchange on a thermographic record in achieving the conditions of $mCp \cdot \overline{V}_1 = m_0 C p_0 \overline{V}$ for each moment, is a necessary but not a sufficient condition for determining the amount of heat in the area defined by the deviation of the differential thermogram, because of the different heat-dissipation degree with changing temperatures and pressures.

In order to ensure sufficient accuracy in determining the amount of heat, absorbed by the body under examination, from a differential record, in the proposed device, there is provided along with a temperature scale a calibration scale of the heat sensitivity for the system of registration and measurement, connected with the temperature rise.

Thermal sensitivity $q_s$ is a function $q_s = F(\overline{T})$ when $P_1$ and $\overline{V}$=const, where $$q_s = \frac{Q}{S} \;[\text{cal.}/\text{mm.}^2]$$

Q is the known amount of heat (in cal.) introduced into compartment 58 of the standard heat-exchange,
S is the area (in mm.) defined by the deviation of the differential curve and corresponding to the amount of heat Q at definite temperature and pressure.

The scale of the heat-sensitivity measurement system under conditions of heating, cooling and at constant temperature is plotted by means of differential thermograms reflecting the evolution of a definite amount of heat in compartment 58 by the standard source of heat 68 located in crucible 59 when compartment 57 is empty that is without specimen 53.

The amount of heat, evolved by source 68, is determined by potentiometer circuit 69, or directly, by wattmeter 70 from the power it consumes during a definite period of time. Simultaneously with switching in heat source 68, light marks are made on the thermogram by lighter 67.

The amount of heat, related to the phase transformation of the substance, is determined, after planimetering the area of the differential curve maximum, from the following formula $$\Delta H = \frac{q_s \cdot S}{m} \;[\text{cal.}/\text{gr.}]$$

where $q_s$ is the heat sensitivity corresponding to the temperature which relates to the average area S of the heat effect under measurement, said area being defined by the deviation of the differential curve.

Due to the fact that the proposed non-contact thermographic-calorimetry device senses, in the first place, the beginning of heat effects on the surface of the body under examination by the surface of the thermo-sensitive element surrounding this body, the plotting of calibration temperature scale by means of indication materials for a direct record and an optical pyrometer as well as determining from this scale the phase-transition temperature range in alloys, is carried out from the beginning of the differential-curve maximum with a necessary interpreting of the thermograms of heating and cooling.

Pure chemical elements, featured by the absence of supercooling, have their beginning of melting and crystallization at one and the same temperature level of a direct record; this is the case regardless of the increase in the temperature-change rate within a range of 4 to 85°/min.

As an example FIG. 6 shows thermograms of heating and cooling of silver, manganese and iron, as well as a differential thermogram of crystallization of molybdenum; here the results of temperature measurements agree quite accurately with the data given in literature.

The thermogram of silver (FIG. 6a) was recorded in heating at a rate of 60°/min. and in cooling at a rate of 40°/min.

Figure 6A:
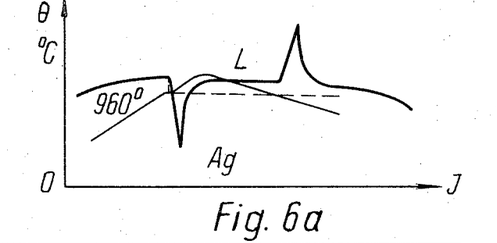
FIGS. 6a, b, c, d shows the thermograms of pure substances.
Figure 6B:
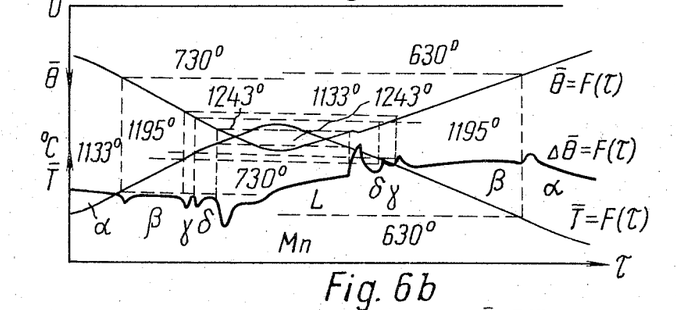

The beginning of appearance of liquid on the surface in heating and the beginning of formation of initial crystals in cooling take place at the same temperature levels.

The thermogram of manganese (FIG. 6b) is recorded at a rate of 50°/min. in heating and 36°/min. in cooling; here all the transformations in a solid state agree with the literature data with an accuracy of ±8°. As to the polymorphic $\beta \to \alpha$ transformation it features a 100° C. supercooling.

The thermogram of iron (FIG. 6c) was recorded at a 42°/min. average rate of cooling and heating; here all the transformations in the solid state agree with the literature data to with an error of ±8°.

Figure 6C:
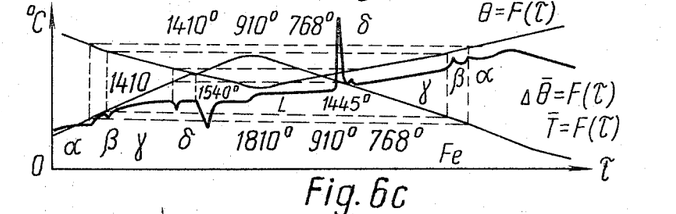

Overcooling of the liquid iron in crystallization amounted to 95° C.

The thermogram of crystallization of molybdenum (FIG. 6d) was recorded at a 85°/min. rate after a rapid rise of temperature up to about 2800° C.

Figure 6D:
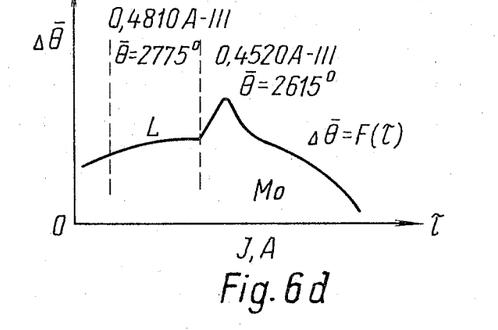

The temperature measured with the help of an optical pyrometer was recorded by vertical light marks.

The plotted temperature scales for the specimen compartment $\overline{Q} = F(l)$ and for the standard-substance compartment $\overline{T} = F(l)$ (FIG. 7), being intended for direct records, are predominantly linear relations which agree quite accurately with the three temperature ranges of the optical pyrometer $\overline{Q} = F(I)$.

Figure 7:
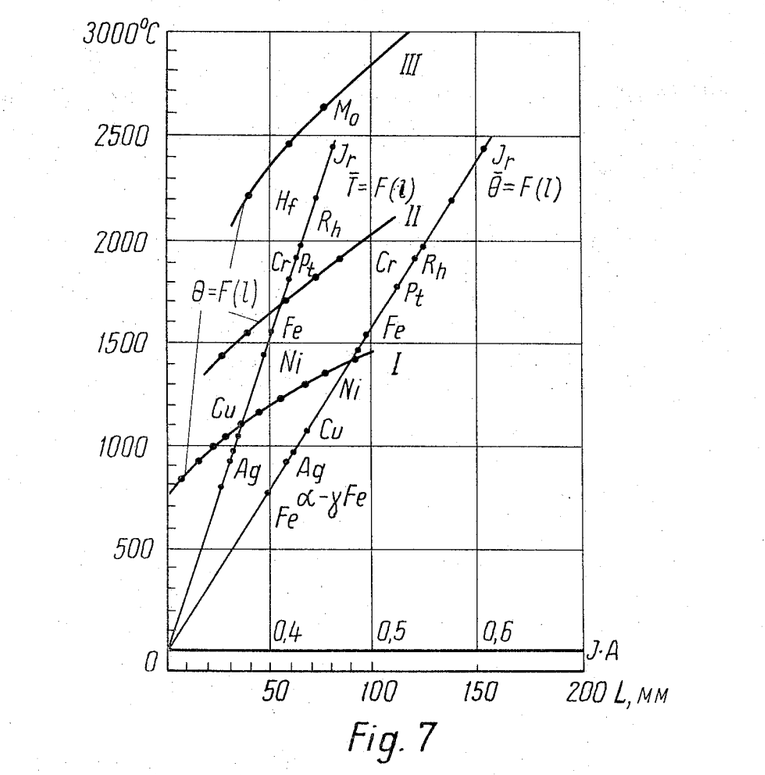
FIG. 7 shows a temperature scale.

(I filter 800–1400° C.; II filter 1400–2000° C.; III filter 2000–3000° C.) where $l$ (in mm.) is the deviation of the direct record from the zero temperature, and I is the current flowing through the pyrometer lamp filament.

Figure 8A:
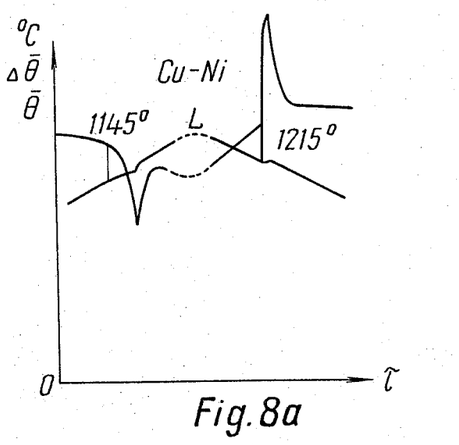
FIGS. 8a, b show the thermograms of Cu-Ni and Cr-Fe-Ni alloys.
Figure 8B:
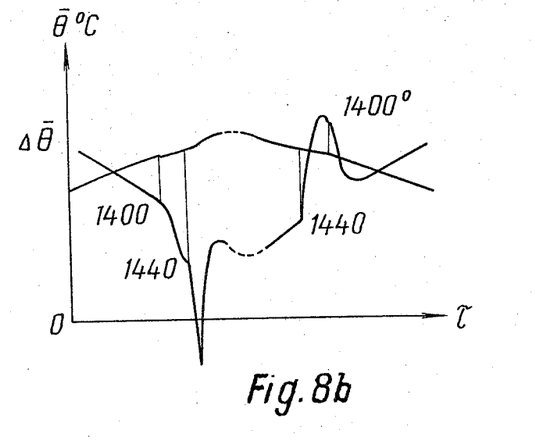
Figure 9:
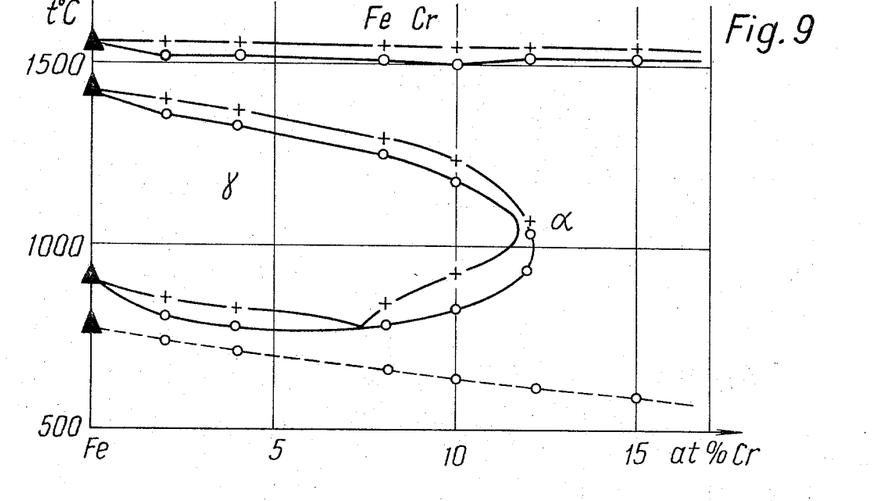
FIG. 9 shows a Fe-Cr equilibrium diagram.

In determining the temperature limits of phase transitions in alloys of a solid-solution type, for instance in a Cu-Ni alloy (23 weight percent of Ni) (FIG. 8a) and a Cr-Fe-Ni alloy (Cr—18%, Fe—74%, Ni—8%) (FIG. 8b), the beginning of melting agrees with the known literature data as regards to solidus line, and the beginning of crystallization—as regards the liquidus line. The thermograms were recorded at a rate of 42°/min. In the same way it was possible from the thermograms of heating and cooling to reproduce positively enough the Fe-Cr equilibrium diagram in the gamma-loop region (FIG. 9); here the thermograms of heating (o) made it possible to determine the lower temperature limit of the gamma-loop two-phase region and the solidus line. The upper limit of the gamma-loop two-phase region and the liquidus line were determined from the thermograms of cooling (t).

Thus the results of measurements conform the fact of direct record of the mean integral temperatures from the volumes defined by the surface of the crucible and the internal insulating walls of the block, the temperature of said walls being almost at no variance with the temperature of the body surface in the range of the allowable error.

The rise of temperature and pressure usually involves the increase of heat escape and hence the increase of dissipation of the measured amount of heat which is absorbed or evolved by the surface of the bodies under examination as a consequence of heat-exchange with the ambient medium.

Therefore plotting of a heat-sensitivity calibration scale is envisaged in the device for definite heat conditions and parameters of the system of recording and measurement.

Figure 10A:
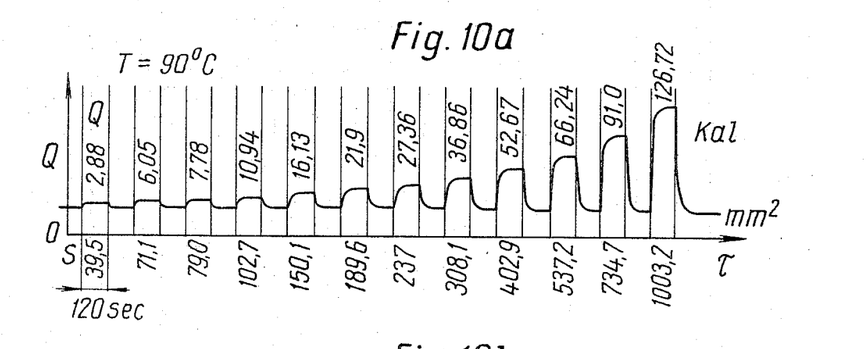
FIGS. 10a, b show differential sensing curves of heat-pulse source effects.
Figure 10B:
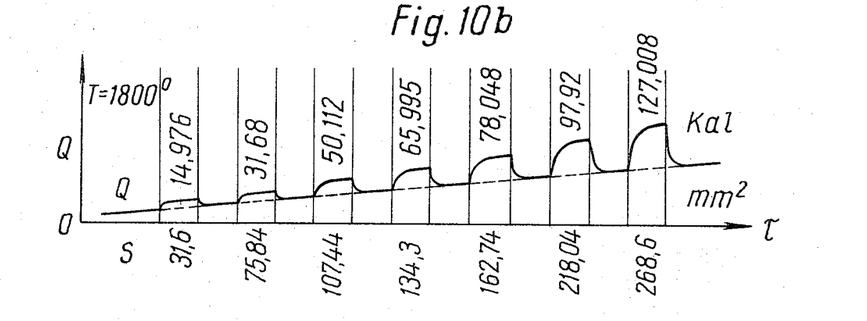

As examples of such scale FIG. 10 (a, b) shows differential thermograms of heat pulses at 90° C. (FIG. 10a) and 1800° C. (FIG. 10b); here the beginning of switching on and off the growing heat pulses in an empty crucible of the standard-substance compartment coincides with a vertical light mark on the thermograms within the range of 2.88–127 cal.

The thermograms in FIG. 10 (a, b) distinctly show the areas of equal size which relate to the amount of the heat absorbed or evolved by the empty crucible and the structural elements.

Therefore planimetering of areas entails measurement of distances between the light marks and the height of the heat pulse maximum.

Figure 11:
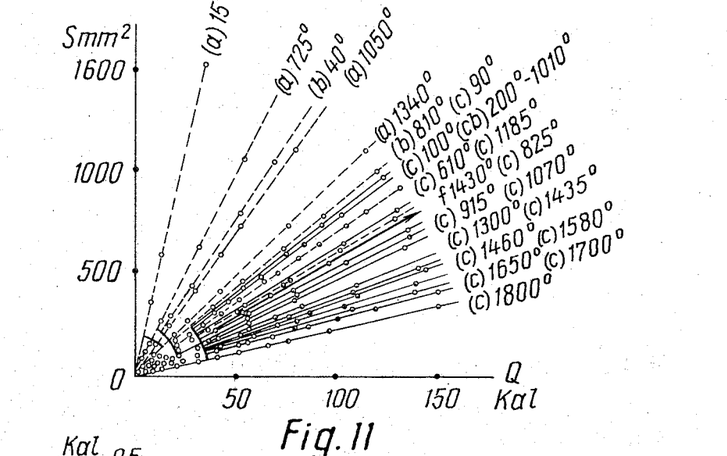
FIG. 11 shows the relation of areas, defined by the deviation of differential curves, to the amount of heat at various temperatures and pressures.

Thus the thermograms, recorded for various pressures of helium ($P=1.10^{-5}$ mm. Hg (a); 380 mm. Hg (b) and 600 mm. Hg (c), indicate that for a definite temperature and pressure the areas, defined by the differential curve, are in direct proportion to the heat effects (FIG. 11).

Figure 12:
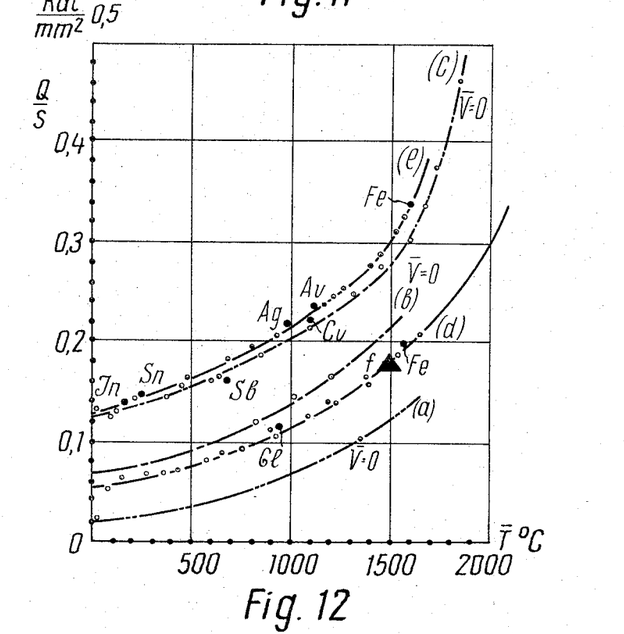
FIG. 12 shows the relation of thermal sensitivity to temperature and pressure.

FIG. 12 illustrates the heat-sensitivity scales of the recording and measurement system which relate to the area defined by the deviation of the differential curve in dependence with the temperature. The scales (a), (b) and (c) relate to isothermic conditions when $\overline{V}=0°/mm$. and the pressures are equal to those indicated for FIG. 11. The scales (d) and (e) were plotted at a pressure of 660 mm. Hg and temperature-measurement rates of 21 and 42°/min. for respective 100 to 120 cal., constant heat pulses introduced into the empty crucible of the standard-substance compartment.

It should be noted that the load of the bridge circuit of the differential-resistance thermometer and, hence, its sensitivity relating to the scale (d), were doubled as compared to all the scales represented in FIG. 12. Therefore the total heat sensitivity is higher than that in scales a, b, c, d, e. The table below gives the results obtained in determining the melting heat for several pure chemical elements in accordance with the plotted calibrating scales.

PHASE-TRANSFORMATION TEMPERATURE AND MELTING HEAT OF PURE METALS

| No. | Element | Phase-transformation temperature, °C. | | Melting heat, ΔH | | | Specimen mass, gr. | Temperature change rate, °/min. |
| --- | --- | --- | --- | --- | --- | --- | --- | --- |
| | | Literature data | Experimental data | Literature data, kcal./grat. | Experimental data | | | |
| | | | | | Cal./gr. | Kcal./grat. | | |
| 1 | 2 | 3 | 4 | 5 | 6 | 7 | 8 | 9 |
| 1 | Copper | 1,083 | 1,083±5 | 3.1±0.1 | 47.82 | 3.03 | 2.07 | 42 |
| 2 | Silver | 960 | 960±2 | 2.7±0.1 | 23.78 | 2.56 | 2.96 | 42 |
| 3 | Gold | 1,063 | 1,063±1 | 3.05±0.1 | 16.75 | 3.29 | 4.8 | 42 |
| 4 | Iron | 1,540 | 1,535±5 | 3.7±0.2 | 66.0–66.3 | 3.68–3.7 | 1.1 | 21, 42 |
| | γ→δ | 1,410 | 1,405±5 | 0.35–0.207 | 5.065 | 0.283 | 2.05 | 42 |
| | α→δ | 910 | 900±10 | 0.27–0.324 | 3.82 | 0.214 | 2.05 | 42 |
| | Magnetic transformation | 768 | 768±10 | | | | | |
| 5 | Nickel | 1,453 | 1,450±5 | 4.22±0.8 | 68.0 | 3.39–4.43 | 1.76 | 42 |
| 6 | Cobalt | 1,495 | 1,490±5 | 3.75±0.3 | 67.79 | 3.99 | 1.7 | 42 |
| | α→β | 450 | 363±5 | | 1.506 | 0.088 | 1.7 | 42 |
| | Magnetic transformation | 1,125 | 1,130±5 | | | | | |
| 7 | Palladium | 1,555 | 1,553±5 | 4.0 | 39.617 | 4.21 | 3.925 | 42 |
| 8 | Chromium | 1,900 | 1,930±8 | 3.3–4.6 | 97.79 | 5.08 | 1.1 | 42 |
| 9 | Manganese | 1,243 | 1,243±5 | 3.5 | | | 2.954 | 42 |
| | α→β | 727 | 730±5 | | | | 2.954 | 42 |
| | β→γ | 1,095 | 1,095±5 | | | | 2.954 | 42 |
| | γ→δ | 1,133 | 1,133±5 | | | | 2.954 | 42 |
| 10 | Germanium | 937 | 937±5 | 7.6–7.3±0.3 | 97.128 | 7.05 | 1.48 | 21 |
| 11 | Silicon | 1,412 | 1,410±5 | 11.1 | 385.75 | 10.82 | 0.568 | 42 |
| 12 | Tin | 232 | 232±1 | 1.69±0.3 | 14.78 | 1.75 | 2.58 | 42 |
| 13 | Stibium | 630 | 630±1 | 4.75±0.1 | 43.2 | 5.2 | 1.707 | 42 |
| 14 | Indium | 156 | 155±1 | 0.78±0.2 | 6.8 | 0.779 | 1.2 | 42 |

From FIG. 12 it follows that a decrease in the rate of heating and cooling and a twofold increase of the bridge-circuit load reveal a coincidence of heat-sensitivity characteristics taken in isothermal conditions (check-point F) at a rate of 21°/min.; the measurement accuracy limits in this case being from 3 to 0.5%.

From the literature data, pertaining to the results of melting-heat determination, as well as from the known mass and corresponding area of the maximum differential-curve related to its mean temperature in FIG. 12 were plotted heat sensitivities of indium, stibium, tin, silver, gold, copper, iron and germanium, which in the range of allowable error come within the confines of the heat sensitivity scales (e and d in FIG. 12) plotted by using a standard heat source.

What is claimed is:

1. A device for thermographic calorimetry comprising: means for continuously heating and cooling the sample under investigation at a predetermined rate; a block for measuring the temperature and sensing changes in the heat content of said sample, said block being provided with a heat insulating casing and divided by a heat insulating partition into two identical chambers, one of which contains the sample under study and the other a standard source of heat radiation, each chamber including low-ohmic resistors arranged in spaced relation around said sample under investigation and said standard source of heat radiation; all of said elements in each of said chambers and said means for continuously heating and cooling said sample under investigation at a predetermined rate being arranged in accordance with their thermal and physical properties in symmetric relation about the vertical axis of said device, all said elements, save said sample, being balanced in accordance with their thermal and physical properties so that each chamber is supplied with an identical quantity of heat per unit time, means for recording temperature and quantity of heat over time in direct and differential form, the latter said means being connected with said low-ohmic resistors, and means connected with said standard source of heat radiation for powering the same and measuring the power required thereby.

2. A device according to claim 1, wherein said sample under investigation and said standard heat source are placed in crucibles.

3. A device according to claim 1, wherein said low-ohmic resistors in each of said block chambers are arranged along the cylindrical generatrix between said heat insulating casing and said sample and standard source of heat radiation.

4. A device according to claim 1, wherein said means for recording temperature and quantity of heat over time in direct and differential form comprises three galvanometers, one of which is connected diagonally across the bridge circuit of said low-ohmic resistors, the other two being connected in parallel to said low-ohmic resistors.

5. A device according to claim 1, wherein said block for measuring the temperature and sensing changes in the heat content of said sample under investigation is surrounded with a screen protecting it from the effect of convective flows.

6. A device according to claim 1 for checking the accuracy of measurements, wherein one of said block chambers is provided with an opening through which a standard optical pyrometer can be inserted.

7. A device according to claim 5, wherein the body of said block, said screen and said low-ohmic resistors are made of tungsten, said device being used to measure high temperatures in an atmosphere of clean inert gas and in vacuum.

References Cited

FOREIGN PATENTS 171,135   10/1965   Russia.

OTHER REFERENCES

Speros, D. M., et al.; "Realization of Quantitative DTA: Heats and Rates of Solid-Liquid Transitions," in Journal of Physical Chemistry, 67(10); pages 2164–2168, October 1963.

Charnel, R., et. al.: "Differential Microcalorimetric Study of Stability," in Journal de Chemie Physique, 52(6): pages 441–446, June 1956.

Clarebrough, L. M., et al.: "The Determination of the Energy Stored in a Metal during Plastic Deformation." In Proceedings of the Royal Society of London, A215: pages 507–524. Nov.–Dec. 1952.

JAMES J. GILL, *Acting Primary Examiner.*

RICHARD C. QUEISSER, *Examiner.*

J. C. GOLDSTEIN, *Assistant Examiner.*